United States Patent [19]
Schofield et al.

[11] Patent Number: 6,117,935
[45] Date of Patent: *Sep. 12, 2000

[54] RHEOLOGY MODIFIER FOR SOLVENT-BASED COATINGS

[75] Inventors: John David Schofield, Bury; Paul Gough, Shaw, both of United Kingdom

[73] Assignee: Zeneca Limited, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,657

[22] PCT Filed: Oct. 16, 1995

[86] PCT No.: PCT/GB95/02433

§ 371 Date: Apr. 4, 1997

§ 102(e) Date: Apr. 4, 1997

[87] PCT Pub. No.: WO96/14344

PCT Pub. Date: May 17, 1996

[30] Foreign Application Priority Data

Nov. 2, 1994 [GB] United Kingdom .................... 9422093

[51] Int. Cl.$^7$ .................................... C08L 39/00
[52] U.S. Cl. .................... 524/555; 524/560; 526/305; 526/307.6; 526/318.4; 526/318.44
[58] Field of Search .................... 524/555, 560; 526/307.6, 318.4, 305, 318.44

[56] References Cited

U.S. PATENT DOCUMENTS

| | | | |
|---|---|---|---|
| 3,825,514 | 7/1974 | Drury et al. ............................ | 260/29.6 |
| 4,033,919 | 7/1977 | Lawson .................................... | 524/555 |
| 4,423,199 | 12/1983 | Chang ..................................... | 524/555 |
| 4,525,496 | 6/1985 | Adaway ................................... | 524/555 |
| 4,533,708 | 8/1985 | Costello ................................ | 526/307.6 |
| 4,638,865 | 1/1987 | Ball ........................................ | 526/307.6 |
| 4,722,958 | 2/1988 | Sauer ..................................... | 526/307.6 |
| 4,810,763 | 3/1989 | Mallya .................................. | 526/318.4 |
| 4,842,852 | 6/1989 | Nowak ................................... | 526/307.6 |
| 4,861,499 | 8/1989 | Neff ........................................ | 524/555 |
| 4,870,137 | 9/1989 | Lopez et al. ........................... | 525/329.9 |
| 5,045,587 | 9/1991 | Tanaka .................................... | 524/555 |
| 5,070,164 | 12/1991 | Min ........................................ | 526/318.4 |
| 5,231,145 | 7/1993 | Brueckmann ........................ | 526/318.4 |
| 5,296,577 | 3/1994 | Tamura ................................. | 526/307.6 |
| 5,334,686 | 8/1994 | Ando ....................................... | 526/265 |
| 5,605,970 | 2/1997 | Selvarajan ............................. | 526/318.4 |
| 5,773,546 | 6/1998 | Tomlin ................................. | 526/318.43 |

FOREIGN PATENT DOCUMENTS

| | | |
|---|---|---|
| 583 086 | 2/1994 | European Pat. Off. . |
| 2 279 781 | 2/1976 | France . |
| 2 693 202 | 1/1994 | France . |
| 1 510 190 | 5/1978 | United Kingdom . |
| 2 001 083 | 1/1979 | United Kingdom . |
| 2 185 259 | 7/1987 | United Kingdom . |
| 92/07553 | 5/1993 | WIPO . |

OTHER PUBLICATIONS

Derwent Abstracts, SU 1231842 and SU 717078.
Derwent Abstracts of SU 717078; SU 1231842 and WO 92/07553.

*Primary Examiner*—Paul R. Michl
*Attorney, Agent, or Firm*—Pillsbury Madison & Sutro LLP

[57] ABSTRACT

A rheology modifier for solvent-based coatings which is a polyacrylic acid or a poly($C_{1-4}$)-alkyl acrylic acid wherein at least 30% of the —COOH groups are converted to ester and/or amide groups. Preferred compounds are esters of polyacrylic acid where about 50% of the —COOH groups are esterified with a $C_{4-12}$-alcohol.

16 Claims, No Drawings

RHEOLOGY MODIFIER FOR SOLVENT-BASED COATINGS

This application is the national phase of international application PCT/GB95/02433, filed Oct. 16, 1995 which designated the U.S.

The present invention relates to solvent-soluble polymers, their preparation and their use as a rheology modifier (hereinafter RM) in non-aqueous pigment formulations.

Pigment formulations especially heat-treated paints for use in the coating industry having lower Volatile Organic Compound (VOC) content (e.g. reduced organic solvent) have become more popular. Such formulations have a high solids and lower solvent content and in order to maintain acceptable viscosity during application it is normal to use lower MW resins as film-forming binders in the formulation. However, because of the lower solvent content of these formulations, the viscosity increase associated with evaporation of the solvent on drying is less than that of conventional formulations which contain high MW resins and more solvent. This lower increase in viscosity results in a tendency of the coating to sag especially when applied to a vertical or near-vertical surface.

GB 2,269,178 discloses water-soluble amphiphilic polymers derived from polyacrylic acid which contain up to 20% molar ratio of acrylamide residues for use as thickeners in aqueous saline media.

It has now been found that a novel class of esters and amides of polyacrylic acid containing at least 30% molar ratio of amide and/or ester residues can be incorporated into pigment formulations as a RM and that they reduce the propensity of the coating to sag without impairing the film forming characteristics of the coating or causing an unacceptable increase in viscosity of the formulation at high shear. These esters and amides also act as stabilisers and reduce the tendency of any particulate solid dispersed in the formulation to sediment or layer, especially on storage.

According to the invention there is provided a polymer which is a polyacrylic acid or a poly($C_{1-4}$-alkyl) acrylic acid wherein at least 30% of the —COOH groups are converted to —COY groups (hereinafter the "Polymer"); wherein
Y is —$OR^1$ or —$NR^2R^3$;
$R^1$ is $C_{4-8}$-alkyl or cycloalkyl; and
$R^2$ and $R^3$ is each, independently, hydrogen, alkyl or cycloalkyl; or
$R^2$ and $R^3$ together with the nitrogen atom to which they are attached form a ring provided that the total number of carbon atoms represented by $R^2$ and $R^3$ is from 4 to 18.

Preferably, the total number of carbon atoms in $R^1$ or in $R^2$ combined with $R^3$ is not greater than 14, more preferably not greater than 12 and especially not greater than 10. The total number of carbon atoms in $R^1$ or in $R^2$ combined with $R^3$ is at least 6.

Where $R^1$, $R^2$ or $R^3$ is alkyl, it can be linear or branched but it is preferably linear. Examples are n-hexyl, iso-hexyl, n-octyl, 2-ethylhexyl, 3,7-dimethyloctyl, n-nonyl, n-decyl, n-dodecyl, n-tetradecyl, n-hexadecyl and n-octadecyl.

Since some alcohols of formula $R^1$—OH and amines of formula $NHR^2R^3$ which are used to make the Polymer are available commercially as mixed isomers or contain mixed alkyl chains, it is to be understood that each of $R^1$, $R^2$ and $R^3$ may represent a mixture of different alkyl groups.

When $R^1$, $R^2$ or $R^3$ is cycloalkyl, it preferably contains up to 6 carbon atoms and is especially cyclohexyl.

When $R^2$ and $R^3$ together with the nitrogen atom to which they are attached to form a ring it is preferably 6-membered.

Examples are morpholino, piperidino, piperazino, and N-alkylpiperazino.

It is also preferred that Y is —$OR^1$.

According to one aspect of the invention there is provided a polymer of formula 1

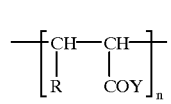

I wherein
each, independently, of the n groups represented by R is H or $C_{1-4}$-alkyl;
each, independently, of the n groups represented by Y is —OH, —$OR^1$ or —$NR^2R^3$, and
n is from 200 to 25,000;
provided that the percentage of groups in which Y is other than —OH is greater than 30% of the total number of groups represented by Y.

The different monomer units having the side chains —COOH, —$COOR^1$ and —$CONR^2R^3$ may be randomly spaced along the polymer backbone or they may be present as blocks of the same monomer.

Preferably, the percentage of the groups in which Y is other than H is at least 35%, more preferably at least 40% and especially at least 50% of the total number of groups represented by Y. It is also preferred that the percentage of groups in which Y is other than H is less than 95%, preferably less 90%, more preferably less than 80% and especially less than 70% of the total number of groups represented by Y.

Preferably, n is greater than 250, more preferably greater than 500 and especially greater than 800. It is also preferred that n is less than 20,000, more preferably less than 5,000 and especially less than 2,000. Useful polymers have been obtained where n is about 1,000.

When R is $C_{1-4}$-alkyl, it is preferably methyl. It is also preferred that R is H.

Good results have been obtained when either $R^1$ is n-octyl or where $R^2$ is H and $R^3$ is n-octyl.

The Polymer may be prepared by any method known to the art. For convenience, the Polymer is hereinafter referred to as derived from acrylic acid but it is to be understood as including those derived from 2-($C_{1-4}$-alkyl) acrylic acid such as methacrylic acid. Thus, it may be made by copolymerisation of acrylic acid or an oligomer with an acrylamide or an oligomer, an acrylic acid ester or an oligomer or a mixture of the acrylamide and ester or oligomer thereof. The resultant polymer is a random or block copolymer containing specific oligomeric units of acrylic acid, acrylate and/or acrylamide.

It is preferred, however, to make the Polymer by reacting polyacrylic acid with the appropriate alcohol $R^1$—OH or the amine $NHR^2R^3$ or a mixture thereof wherein $R^1$, $R^2$ and $R^3$ are as defined hereinbefore. Polymer which is made by condensing an amine and/or alcohol with polyacrylic acid contains a more random distribution of ester and/or amide groups than Polymer made by the above co-polymerisation process. Thus, for example the Polymer is obtainable by reacting polyacrylic acid, preferably in aqueous solution, with the amine and/or alcohol in a reaction vessel equipped with a Dean and Stark Water Separator. The reaction is preferably carried out in an inert atmosphere such as under a blanket of nitrogen. The reactants are first heated at a temperature above 100° C. to remove the water and then heated preferably above 120° C., more preferably above 140° C. and especially above 160° C. In order to prevent charring, the temperature is preferably less than 250° C., more preferably less than 210° C. and especially less than 190° C. The condensation of the polyacrylic acid with the alcohol is facilitated by incorporating a catalyst such as sulphuric acid, methane sulphonic acid, p-toluene sulphonic acid, zirconium naphthenate, zinc acetate, stannous octoate or a tetraalkyl titanate, especially tetra-butyl titanate. The reactants are stirred together in the presence of the catalyst until condensation is complete. Typically, the reaction does not require more than 10 hrs when the temperature is between 160 and 190° C. After cooling, the Polymer is obtained as a glass or waxy solid which readily dissolves in organic solvents.

The polyacrylic acid has an MW which is preferably greater than 18,000, more preferably greater than 36,000 and especially greater than 57,600. It is also preferred that the MW of the polyacrylic acid is less than 1440,000, preferably less than 360,000 and especially less than 144,000. Useful Polymers have been obtained from polyacrylic acid with a MW of about 75,000.

As disclosed hereinbefore the Polymer is useful as an RM and can be included in non-aqueous pigment formulations to reduce sag when the formulation is applied to vertical and near-vertical surfaces. Thus, it can be incorporated into non-aqueous media which contain a particulate solid dispersed therein.

According to a further aspect of the invention there is provided a formulation comprising the Polymer, a resin, a particulate solid and a non-aqueous medium.

The resin may be any resin which is suitable for use as a film-forming binder in the coating industry and is typically a thermosetting resin comprising a cross-linkable resin and a cross-linking agent. Examples of cross-linkable resins are oil-free and saturated polyesters, thermosetting acrylics, vinyl acrylics, alkyd, particularly non-drying alkyd, epoxide and modified epoxide, silicone-based resins, epoxy, urethane and diacrylates such as tripropylene glycoldiacrylate.

The cross-linking agent preferably contains basic groups. Examples of such cross-linking agents are urea-formaldehyde, melamine-formaldehyde, alkoxymethylmelamines such as hexamethoxymethylmelamine and urea, glycoluril and benzoguanamine based resins as described, for example, on page 105 of European Resin Directory 1993, published by European Resin Manufacturers Association. Other suitable cross-linking agents containing basic groups are polyamide and polyamidoamine type resins as disclosed in Table 124 of the above reference.

The particulate solid may be any material which it is desired to stabilised in an organic medium in a finely divided state and is especially a pigment, extender or filler. A preferred solid is a pigment especially those described in the Third Edition of the Colour Index (1971) and subsequent revisions of, and supplements thereto, under the chapter headed "Pigments".

Examples of inorganic pigments are titanium dioxide, zinc oxide, Prussian blue, cadmium sulphide, iron oxides, vermilion, ultramarine and the chrome pigments, including chromates, molybdates and the mixed chromates and sulphates of lead, zinc, barium, calcium and mixtures and modifications thereof which are commercially available as greenish-yellow to red pigments under the names primrose, lemon, middle, orange, scarlet and red chromes.

Examples of organic pigments are those from the azo, disazo, condensed azo, thioindigo, indanthrone, anthanthrone, anthraquinone, isodibenzanthrone, triphendioxazine, quinacridone and phthalocyanine series, especially copper and nickel phthalocyanines and their halogenated derivatives and also lakes of acid, basic and mordant dyes. Carbon black also behaves like an organic pigment in its dispersing properties although strictly an inorganic solid.

Preferred organic pigments are phthalocyanines, especially copper phthalocyanines, monoazos, disazos, indanthrones, anthanthrones, quinacridones and carbon blacks.

A preferred inorganic pigment is titanium dioxide.

Examples of extenders and fillers are talc, kaolin, silica, barytes and chalk.

The non-aqueous medium is preferably a liquid organic medium which may be polar or non-polar.

By the term "polar" in relation to the organic medium is meant an organic liquid capable of forming moderate to strong bonds as described in the article entitled "A three Dimensional Approach to Solubility" by Crowley et al in Journal of Paint Technology, Vol.38, 1966, at page 269. Such organic liquids generally have a hydrogen bonding number of 5 or more as defined in the above-mentioned article.

As examples of such polar organic liquids there may be mentioned, amines, ethers, especially lower alkyl ethers, organic acids, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in table 2.14 on pages 39 and 40 and these liquids all fall within the scope of the term polar organic liquid as used in this specification.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methylethylketone, di-ethylketone, di-iso-propylketone, methyl-iso-butyl-ketone, di-iso-butylketone, methyl-iso-amylketone, methyl-n-amyl-ketone and cyclohexanone; alkyl esters such as methyl acetate, ethyl acetate, isopropyl acetate, butyl acetate, ethyl formate, methyl propionate and ethyl butyrate, glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols such as methanol, ethanol, n-propanol, isopropanol, n-butanol and isobutanol and diakyl and cyclic ethers such as diethylether and tetrahydrofuran.

The substantially non-polar, organic liquids which may be used, either alone or in admixture with the aforementioned polar liquids, are aromatic hydrocarbons, such as toluene and xylene, and halogenated aliphatic and aromatic hydrocarbons, such as trichloro-ethylene, perchloroethylene and chlorobenzene. However, aliphatic hydrocarbons, such as petroleum fractions and white spirit are preferably only employed in admixture with the above-mentioned polar liquids and the proportion of an aliphatic hydrocarbon should preferably not exceed a level which reduces the ability of the mixture to completely dissolve the resins generally employed in end use formulations, such as paints.

The organic liquid is preferably a polar organic solvent or a substantially non-polar aromatic hydrocarbon or halogenated hydrocarbon.

The amount of the non-aqueous medium in the formulation is preferably less than 50%, more preferably less than 40% and especially less than 25% by weight based on the combined weight of non-aqueous medium and resin.

The Polymer has been found particularly effective as a RM in coating formulations which contain basic groups such as those present on coated pigments, certain resins which form an integral part of paint films and dispersants which are present to stabilise the particulate solid in finely divided form in the non-aqueous medium.

The Polymer may thus be used as RM to inhibit sag in coating formulations containing the resin and non-aqueous medium.

The Polymer has been found particularly effective in coating formulations comprising a particulate solid and a non-aqueous medium wherein the particulate solid is dispersed in the organic medium by a dispersant comprising a poly ($C_{2-4}$-alkyleneimine) carrying at least two mono- or poly-(carbonyl-$C_{1-7}$-alkyleneoxy) chains. Such dispersants are disclosed in EP 208,041.

According to a further aspect of the invention there is provided a composition comprising
a) the Polymer; and
b) a dispersant comprising a poly($C_{2-4}$-alkyleneimine) carrying at least two mono- or poly-(carbonyl-$C_{1-7}$-alkyleneoxy) chains.

Each alkylene group of the dispersant in the carbonyl-$C_{1-7}$-alkyleneoxy group, hereinafter referred to as the "CAO group", or the poly(carbonyl-$C_{1-7}$-alkyleneoxy) chain, hereinafter referred to as the "PCAO chain", preferably contains from 3 to 6 carbon atoms. An especially preferred alkylene group is pentamethylene wherein the CAO group is 5-oxypentamethylene-1-carbonyl hereinafter referred to as "OPMC") derivable from ε-caprolactone. The PCAO chain may contain a mixture of alkylene groups of different length but is preferably a homopolymer, especially of OPMC. The PCAO chain or the CAO group may carry a chain-stopping terminal group at the free end, such as optionally substituted alkyl, e.g. alkyl, alkoxyalkyl or haloalkyl, where the absence of a terminal hydroxy group prevents formation or further growth of the PCAO chain. The PCAO chain preferably contains from 2 to 100, and more preferably from 3 to 80, CAO groups.

Each CAO group or PCAO chain is attached to the poly($C_{2-4}$-alkylene imine), hereinafter referred to as "PAI", through a covalent "amide" link,

between a terminal carbonyl group of the CAO or PCAO chain and a primary or secondary amino group in the PAI, or through an ionic "salt" link,

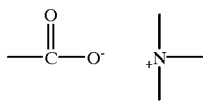

between a terminal carboxylate group of the CAO group or the PCAO chain and substituted ammonium ion in the PAI. Because the dispersant contains at least two CAO groups or PCAO chains it may contain a mixture of amide and salt links depending upon the severity of the conditions under which it is prepared.

The dispersant may contain more than two CAO groups or PCAO chains and preferably contains from 4 to 2000, more preferably from 4 to 1000 of these.

The PAI is preferably a poly(ethyleneimine), hereinafter referred to as "PEI", which may be branched or straight-chained. A preferred dispersant comprises PEI carrying at least two CAO groups or PCAO chains attached thereto by amide and/or salt links. The PAI preferably has a weight-average molecular weight from 500 to 600,000 and more preferably from 1,000 to 200,000.

The dispersant is derivable from a PAI and a CAO acid or a PCAO acid, i.e. a compound of the formula, H(O-$C_{1-7}$-alkylene-CO)$_n$OH in which n is from 1 to 100, or a cyclic precursor thereof, such as a lactone. The length of the PCAO chain in the PCAO acid may be controlled by the presence of a carboxylic acid free from hydroxy groups, in the preparative process, to act as a chain stopper. Where the dispersant carries PCAO chains formed by the polymerisation of a carbonylalkyleneoxy monomer in the presence of the PAI, there is less need for a chain stopper, because the PCAO chain grows on the PAI and cannot react together by hydroxy groups. The dispersant may be derived from a PAI having at least two primary, secondary or tertiary amino groups, and CAO or PCAO acid, in which case reaction between a p-, s- or t-amino group in the PAI and a terminal carboxyl group on the CAO or PCAO forms an amide or salt link. If the PAI contains a t-amino group salt links only are possible otherwise salt and/or amide links are formed depending on the reaction conditions.

Each CAO group is preferably terminated by a group which is free from OH/NH$_2$ groups, such as alkanecarbonyl. Termination is conveniently effected by reaction of the CAO acid, or precursor, with a carboxylic acid which is free from hydroxy or amino groups, e.g. an alkane- or an alkoxy-alkanecarboxylic acid, such as caproic acid, lauric acid, stearic acid, methoxyacetic acid and especially by such an acid containing twelve or more carbon atoms.

The Polymer has been found especially effective where the dispersant is obtainable by reacting together ε-caprolactone, polyethylene imine having a MW of about 20,000 and lauric acid.

The Polymer has also been found particularly effective in compositions containing a dispersant which is the reaction product of a PAI and a polyester having a free carboxylic acid group.

According to a still further aspect of the invention there is provided a composition comprising
a) the Polymer; and
b) a dispersant which is the reaction product of a PAI and a polyester derived from a hydroxycarboxylic acid of formula 2

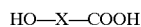    2 wherein
X is a divalent saturated or unsaturated aliphatic group containing at least 8 carbon atoms and in which there are at least 4 carbon atoms between the hydroxy and carboxylic acid groups, or from a mixture of such hydroxycarboxylic acid and a carboxylic acid which is free from hydroxy groups.

The group X is preferably an alkylene or alkenylene group and preferably contains not greater than 30 carbon atoms, and especially not greater than 20 carbon atoms. Examples of suitable hydroxycarboxylic acids of formula 2 are 12-hydroxystearic acid, ricinoleic acid, 12-hydroxydecanoic acid and 6-hydroxycaproic acid.

The polyester is preferably reacted with PAI in a weight ratio between 1:1 and 50:1, and more preferably between 2:1 and 20:1.

The preferred PAI is PEI as defined hereinbefore.

The reaction product of the hydroxylic acid and the PAI is a salt or an amide depending on the severity of the reaction conditions employed. The salt and/or amide may be partially neutralised with an acid, especially a mineral acid or it may be alkylated, the alkyl group added being optionally substituted, by reaction with an alkyl sulphate such as dimethylsulphate, whereupon a salt is also formed.

The preparation of the reaction product of the hydroxycarboxylic acid and PAI is described in GB 2,001,083.

A particularly useful dispersing agent is the reaction product obtainable from approximately 3.3 weight equivalents of poly(12-hydroxystearic acid) and 1 weight equivalent of PEI with an average MW of about 20,000.

The Polymer has also been found surprisingly effective when used in conjunction with a dispersant derived from a hydroxycarboxylic acid and which is anionic.

Thus, according to a still further aspect of the invention there is provided a composition comprising, a) the Polymer; and
b) a dispersant of the formula 3 or 4;

$$[A^1—CO—(O—B—CO)_p]_k—D—L_qM \qquad 3$$

$$ML—[(O—B—CO)_p—X—D^1]_k \qquad 4$$

wherein $A^1$ is H, a hydrocarbon group or a hydrocarbon group substituted by a group selected from halogen, hydroxy, amino, alkoxy;

B is a divalent hydrocarbon group;

p is from 1 to 100;

k is 1 or 2;

D is a polyvalent linking group;

L is a phosphate, phosphonate, sulphate, sulphonate or methylenecarboxylate provided that the methylene group is not attached to a carbon atom of an unsubstituted hydrocarbon chain containing two or more carbon atoms;

q is 1 or 2;

M is a cation;

$D^1$ is an aliphatic or alicyclic group;

X is O, S or NR; and

R is H, alkyl, alkenyl, cycloalkyl or phenyl.

It is preferred that, when m is 1, $A^1$ and $D^1$ contain at least 6 carbon atoms and the dispersant contains at least 12 carbon atoms.

$A^1$ is preferably the residue ($A^1$—CO—) of an esterifiable carboxylic acid of the formula $A^1$—COOH, in which $A^1$ is H, a hydrocarbon or $A^1$ is preferably an alkyl, alkenyl, cycloalkyl or polycycloalkyl group containing up to 50, more preferably up to 35, carbon atoms.

D is preferably a di- or tri-valent, bridging group linking the acid group to the ester chain, $A^1CO(O—B—CO)_p—$, especially a group $D^2$ which is a bridging group of the formula —X—G—Y— wherein X is O, S or NR and Y is O, NR or a direct link, in which each R independently is as defined hereinbefore or, where X and Y are both NR, the two groups, R, may form a single alkylene or alkenylene group linking the two nitrogen atoms to which they are attached, and G is alkylene, alkenylene, cycloalkylene or arylene. Where D has a valency greater than 2 it may link two or more acid groups to a single ester or two or more ester chains to a single acid group. Where the group L (hereinafter referred to as the "acid group") has more than one valency it may be linked to two or more esters through two bridging groups.

$D^1$ is preferably the residue of an alcohol, a thiol or a primary or secondary amine, $D^1$—XH, in which $D^1$ is an aliphatic or alicyclic group of similar character to $A^1$, and X is O, S or NR in which R is H, alkyl, alkenyl, cycloalkyl, or phenyl, in which the alkyl and alkenyl groups contain up to 20 carbon atoms and the cycloalkyl groups from 4 to 8 carbon atoms. Where the acid group L has more than one valency it may be linked to two polyester chains.

The divalent hydrocarbon group represented by B, which is preferably an optionally substituted alkyl, alkenyl, cycloalkyl or polycycloalkyl group, preferably contains up to 50, more preferably from 3 to 24 carbon atoms, with at least 3 carbon atoms directly between the —O— and —CO— groups.

Optional substituents for $A^1$, $D^1$ and B include halo, especially chloro, hydroxy, amino and alkoxy.

It is preferred that p is from 2 to 75, more preferably 3 to 30, so that the dispersant is an oligo- or poly-ester. Where p=1 it is preferred that the dispersant contains at least 20 carbon atoms.

The acid group L is preferably a sulphonate or phosphonate and q=1.

One preferred dispersant of formula 3 is where $A^1$ is H or a hydrocarbon group; p is 3 to 21; k is 1; q is 1; D is O, NH or a divalent linking group; and B is a group of the formula:

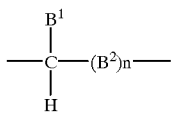

wherein $D^1$ is hydrogen or a monovalent $C_{1-24}$-hydrocarbon group;

$B^2$ is a divalent $C_{1-24}$-hydrocarbon group; and n is zero or 1.

A second preferred dispersant of formula 3 has the formula 5:

$$[A^1—CO—(O—B^3—CO)_p—D^2]_k—LM \qquad 5$$

wherein $B^3$ is selected from alkylene, alkenylene, cycloalkylene, polycycloalkylene and halo derivatives thereof;

$D^2$ is a bridging group of the formula —X—G—Y— wherein X is O, S or NR and Y is O, NR or a direct link, in which each R independently is as hereinbefore defined or, where X and Y are both NR, the two groups, R, may form a single alkylene or alkenylene group linking the two nitrogen atoms to which they are attached, and G is alkylene, alkenylene, cycloalkylene or arylene;

L is phosphonate, sulphonate or methylenecarboxylate, provided that the methylene radical of the methylenecarboxylate group is not directly attached to a carbon atom of an unsubstituted hydrocarbon chain containing two or more carbon atoms;

M is a cation;

k is 1 or 2; and $A^1$ and p are as defined hereinbefore.

A third preferred dispersant of formula 4 has the formula 6:

$$[D^1—X—(CO—B^3—O)_p]_k—LM \qquad 6$$

wherein $D^1$ is an aliphatic or alicyclic group and $B^3$, L, M, X, p and k are as defined hereinbefore.

The aliphatic or alicyclic group represented by $D^1$ is preferably an optionally substituted alkyl, alkenyl, cycloalkyl or polycycloalkyl group containing up to 35 carbon atoms, the optional substituents being preferably selected from halogen, tertiary amino and alkoxy.

The alkylene, alkenylene, cycloalkylene and polycycloalkylene groups represented by $B^3$ preferably contain from 3 to 35 carbon atoms, more preferably from 5 to 20 carbon atoms, with at least 3 and more preferably at least 5 carbon atoms between the —O— and —CO— groups, and are preferably unsubstituted.

The alkylene and alkenylene groups represented by G preferably contain up to 10 carbon atoms and more preferably from 2 to 6 carbon atoms. The cycloalkylene group represented by G preferably contains from 4 to 8 carbon atoms and especially is 1,4-cyclohexylene. The arylene group represented by G is preferably monocyclic and especially 1,4-phenylene.

The alkyl and alkenyl groups represented by R may contain up to 25 carbon atoms and preferably contain up to 5 carbon atoms. Where two groups, R, form a single group this preferably contains up to 10 carbon atoms.

In the compound of Formula 5 in which Y is O the acid group, L, is attached to the group G through an oxygen atom so that phosphonate and O form phosphate and sulphonate and O form sulphate. Similarly, where Y is NR, phosphonate and NR form phosphorimide and sulphonate and NR form sulphonamide.

The cation represented by M is preferably $H^+$, a metal ion, an ammonium ion or a substituted ammonium ion and examples of suitable cations are $Na^+$, $K^+$, $Ca^{2+}$, $NH_4^+$, $N(CH_3)_4^+$ and $NH(CH_3)_3^+$.

Specific examples of the bridging group represented by $D^2$ are —$NHC_2H_4$—, $OC_2H_4$—, —$OC_2H_4O$—, $OC_2H_4NH$—, —$NH(CH_2)_nNH$—, wherein n is from 2 to 5, piperazin-1,4-ylene and phen-1,4-ylene-diamino.

Examples of the groups represented by $A^1$ are methyl, ethyl, $CH_3(CH_2)_4$—, $CH_3(CH_2)_{10}$—, $CH_3(CH_2)_{14}$—, $CH_3(CH_2)_{16}$—, $HO(CH_2)_5$—, $CH_3(CH_2)_7CH=CH(CH_2)_7$—, $CH_3(CH_2)_{28}$—, $CH_3(CH_2)_5CH(OH)(CH_2)_{10}$—, $CH_3(CH_2)_4CH=CHCH_2CH=CH(CH_2)_7$—, $CH_3(CH_2)_5CH(OH)CH_2CH=CH(CH_2)_7$— and $CH_3OCH_2$— and the residue of abietic acid i.e. the radical derived from abietic acid by removal of the carboxyl group.

Examples of the group represented by $D^1$ are methyl, ethyl, $CH_3(CH_2)_9$—, $CH_3(CH_2)_{11}$—, $CH_3(CH_2)_{15}$—, $CH_3(CH_2)_{17}$—, $CH_3(CH_2)_{29}$—, $CH_3(CH_2)_7CH=CH(CH_2)_7$—, $CH_3OCH_2$—, $CH_3(CH_2)_4CH=CHCH_2CH=CH(CH_2)_7$— and the residue of abietyl alcohol, i.e. the radical derived from abietyl alcohol by removal of the OH group.

Examples of the group represented by B and $B^3$ are

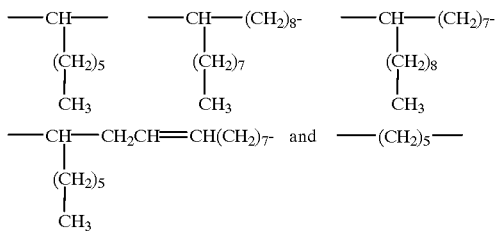

Examples of the groups represented by $B^1$ are H, $C_6H_{13}$, $C_7H_{17}$ and $C_9H_{19}$ and by $B^2$ are —CH—$(CH_2)_{10}$—, —CH—$(CH_2)_8$—, —CH—$(CH_2)_7$—, and —CH—$CH_2CH=CH(CH_2)_7$—.

Dispersants of general formula 3 are disclosed in EP 164,817. As disclosed hereinbefore, the polymer of formula 1 can be used as an RM in non-aqueous compositions.

According to a still further aspect of the invention there is provided the use of the Polymer as an RM in non-aqueous formulations.

The Polymer is preferably at least 0.01% and more, preferably at least 0.05% weight of the composition. It is preferably less than 5%, more preferably less than 2% and especially less than 1% by weight of the composition. Useful effects have been obtained with 0.3 to 0.5% by weight of the composition.

The invention is further illustrated by the following examples wherein all parts are by weight unless indicated to the contrary.

EXAMPLE 1

A 25% aqueous solution of polyacrylic acid (400 parts, MW of 75,000 as Versicol E9 ex Allied Colloids PLC, Bradford, UK) was charged to a split reaction flask equipped with a Dean and Stark water separator. The flask was purged with nitrogen and 1-octanol (100 parts, ex Fisons) added. The reactants were stirred under a nitrogen blanket and heated externally in an oil bath at 180° C. 300 ml water was removed during 1 hour when the temperature of the reaction mass increased from 100 to about 165° C. Tetrabutyltitanate (1 part, ex Aldrich) was then added as catalyst and heating continued for a further 8 hours at 180° C. at the end of which period no further water was removed. On cooling, the product was obtained as a yellow waxy solid having an acid value of 161.2 mg KOH/g. Approximately 50% of the acid groups had been converted to ester groups. This is RM 1.

EXAMPLE 2

Example 1 was repeated except that the 1-octanol was replaced with the equivalent molar amount of 1-decanol. As with example 1, about 50% of the acid groups had been converted to ester groups. This is RM 2.

EXAMPLE 3

A 25% aqueous solution of polyacrylic acid (40 parts, MW 75,000, Versicol E9 ex Allied Colloids PLC, Bradford, UK) and 1-octylamine (10 parts, ex Aldrich) was added to a reaction flask equipped with a Dean and Stark water separator and stirred under a nitrogen blanket. The reactants were heated externally to 180–185° C. Water was removed at 100° C. and the reactants then stirred for a further 4 hours at about 170° C.

The FT-IR spectrum exhibited an acid peak at 1720 $cm^{-1}$ and an amide peak at 1670 $cm^{-1}$ indicating formation of the amide. Analysis showed that 50% of the acid groups had been converted to amide groups.

The product was obtained as a pale yellow gum.

Yield—14.4 parts. This is RM 3.

EXAMPLES 4 AND 5 AND COMPARATIVE RM A

Example 3 was repeated except that the charge of 1-octylamine was reduced to 80%, 60% and 40% thereby resulting in polymers wherein the percent conversion of carboxylic acid groups to amide groups was 40, 30 and 20% respectively. These are RM 4, RM 5 and comparative RM A respectively.

EXAMPLE 6

Example 3 was again repeated except that the 1-octylamine was replaced with the equivalent molar amount of dibutylamine (9 parts, ex Aldrich). Analysis showed that about 50% of the acid groups had been converted to amide groups. This is RM 6.

EXAMPLE 7

Example 1 was repeated except that the 1-octanol was replaced with the equivalent amount of 1-dodecanol. About 50% of the acid groups had been converted to ester groups. This is RM 7.

EXAMPLE 8

Example 1 was repeated except that the 1-octanol was replaced with the equivalent amount of 3,7-dimethyloctanol. Again, analysis showed that about 50% of the acid groups had been converted to ester groups. This is RM 8.

EXAMPLE 9

A 25% aqueous solution of polyacrylic acid (40 parts; MW 30,000 as Versicol E7 ex Allied Colloids PLC, Bredford, England) was charged to a reaction flask fitted with a Dean and Stark water separator. The flask was purged with nitrogen and 1-octanol (10 parts) added. The reactants were then stirred under nitrogen and heated externally to 170° C. After removal of the water formed during the reaction, tertiary butyl titanate (0,3 part) was added and the reactants stirred for a further 8 hrs at 170° C. The product was discharged whilst hot and had an FT-IR and acid value consistent with 83.3% i.e. about 42% of the acid groups had been converted to ester groups. This is RM 9.

EXAMPLE 10

Example 9 was repeated except that the polyacrylic acid MW 30,000 was replaced by the same weight of polyacrylic acid having a MW of 250,000 (Versicol E11). Analysis showed that 43% of the acid groups had been converted to ester groups. This is RM 10.

EXAMPLE 11

A 25% aqueous solution of polymethacrylic acid (400 parts; Versicol K11), 1-octanol (100 parts) and methane sulphonic acid (2.0 pars) were stirred under nitrogen in a reaction vessel equipped with a Dean and Stark water separator. The vessel was heated externally to 130° C. After the water formed during the reaction had been removed, the temperature was raised to 160° C. and maintained at 160° C. for 4 hours. Analysis showed that about 43% of the acid groups had been converted into ester groups. This is RM 11.

EXAMPLES 12 TO 22 AND COMPARATIVE EXAMPLE A

A millbase was prepared by milling the following ingredients on a Red Devil shaker for 30 minutes in a 40 gm sealed glass bottle.

| | |
|---|---|
| 0.48 | RM |
| 0.48 | Dispersant 1 |
| 4.77 | Methoxy propyl acetate |
| 1.59 | Butanol |
| 12.91 | Resin (Reichold Aroplaz 6755-A6-80) |
| 12.50 | Glass beads (3 mm diameter) |
| 31.78 | titanium diozide |

This millbase was mixed with an equal weight of a letdown having the following composition to give a white paint.

| | |
|---|---|
| 2.49 | methoxy propyl acetate |
| 2.49 | Butanol |
| 22.06 | Resin (Reichhold Aroplaz 6755-A6-80) |
| 11.92 | Hexamethoxymethyl melamine (Beetle 370 ex BIP) |
| 0.3 | Acid catalyst (Cycat 4040) |
| 0.06 | silicone leveling agent (DOW 57) |

Dispersant 1 is obtainable by reacting ε-caprolactone with polyethyleneimine and lauric acid.

The sag resistance of the resultant paints was assessed according to ASTM D400-89A using a Leneta Multinotch Applicator whereby the paint was applied to a 4 inch wide Leneta black and white draw down card. Sag was assessed on a scale of 14 to 3 where 14 represents complete absence of sag and 3 represents total merging of the stripes.

The results obtained are given in Table 1 below.

TABLE 1

| Ex. or Comp Example | Rheology Modifier | Sag |
|---|---|---|
| 12 | RM 1 | 14 |
| 13 | RM 2 | 14 |
| 14 | RM 3 | 14 |
| 15 | RM 4 | 13 |
| 16 | RM 5 | 9 |
| 17 | RM 6 | 14 |
| 18 | RM 7 | 10 |
| 19 | RM 8 | 14 |
| 20 | RM 9 | 10.5 |
| 21 | RM 10 | 14 |
| 22 | RM 11 | 14 |
| A | RM A | 5 |

What is claimed is:

1. An organic solvent-soluble polymer which is a polyacrylic acid or a poly($C_{1-4}$-alkyl) acrylic acid wherein at least 30% and less than 70% of the —COOH groups are converted to —COY groups wherein Y is either —OR$^1$ or —NR$^2$R$^3$;

R$^1$ is $C_{6-18}$-alkyl or cycloalkyl;

R$^2$ is hydrogen, alkyl or cycloalkyl; and

R$^3$ is alkyl or cycloalkyl;

the total number of carbon atoms in R$^2$ combined with R$^3$ being at least 6 and not greater than 14.

2. A polymer as claimed in claim 1 of formula 1

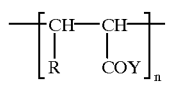

wherein each, independently, of the n groups represented by R is H or $C_{1-4}$-alkyl;

each, independently, of the n groups represented by Y is OH, —OR$^1$ or —NR$^2$R$^3$; and n is from 200 to 25,000;

provided that the percentage of groups in which Y is other than OH is greater than 30% and less than 70% of the total number of groups represented by Y.

3. A polymer as claimed in claim 2 wherein n is from 800 to 2000.

4. A polymer as claimed in claim 2 wherein R is H.

5. A polymer as claimed in claim 1 wherein Y is OR$^1$.

6. A polymer as claimed in claim 1 wherein R$^1$ is n-hexyl, isohexyl, n-octyl, 2-ethylhexyl, 3,7-dimethyloctyl, n-nonyl, n-decyl, n-dodecyl, n-tetradecyl, n-hexadecyl or n-octadecyl.

7. A process for making a polymer as claimed in claim 1 which comprises reacting a polyacrylic acid with R$^1$—OH and/or NHR$^2$R$^3$.

8. A formulation comprising a polymer, a resin and a non aqueous medium, the polymer being an organic solvent soluble polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

9. A formulation comprising a polymer, a resin, a particulate solid and an organic solvent-soluble non-aqueous medium, the polymer being a polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

10. A composition comprising a) a polymer; and b) a dispersant comprising a poly(C$_{2-4}$-alkyleneimine) carrying at least two mono- or poly-(carbonyl-C$_{1-7}$-alkyleneoxy) chains, the polymer a) being an organic solvent-soluble polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

11. A composition according to claim 10 wherein component b) is obtainable by reacting together ε-caprolactone, polyethyleneimine having a MW of about 20,000 and lauric acid.

12. A composition comprising a) a polymer; and b) a dispersant which is the reaction product of a polyalkyleneimine and a polyester derived from a hydroxycarboxylic acid of formula 2

HO—X—COOH     2 wherein

X is a divalent saturated or unsaturated aliphatic group containing at least 8 carbon atoms and in which there are at least 4 carbon atoms between the hydroxy and carboxylic acid groups, or from a mixture of such hydroxycarboxylic acid and a carboxylic acid which is free from hydroxy groups, the polymer a) being an organic solvent soluble polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

13. A composition as claimed in claim 12 wherein component b) is obtainable by reacting approximately 3.3 weight equivalents of poly(12-hydroxystearic acid) and 1 weight equivalent of poly(ethyleneimine) with a MW of about 20,000.

14. A composition comprising a) a polymer; and b) a dispersant of the formula 3 or 4;

$$[A^1\text{—}CO\text{—}(O\text{—}B\text{—}CO)_p]_k\text{—}D\text{—}L_qM \qquad 3$$

$$ML\text{—}[(O\text{—}B\text{—}CO)_p\text{—}X\text{—}D^1]_k \qquad 4$$

wherein

A$^1$ is H, a hydrocarbon group or a hydrocarbon group substituted by a group selected from halogen, hydroxy, amino, alkoxy;

B is a divalent hydrocarbon group;

p is from 1 to 100;

k is 1 to 2;

C is a polyvalent linking group;

L is a phosphate, phosphonate, sulphate, sulphonate or methylenecarboxylate provided that the methylene group is not attached to a carbon atom of an unsubstituted hydrocarbon chain containing two or more carbon atoms;

q is 1 or 2;

M is a cation;

D$^1$ is an aliphatic or alicyclic group;

X is O, S or NR; and

R is H, alkyl, alkenyl, cycloalkyl or phenyl, the polymer a) being an organic solvent-soluble polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

15. The method of modifying the rheology of a non-aqueous formulation which comprises adding to said formulation, an effective amount of an organic solvent soluble polymer which is the polymer being a polyacrylic acid or poly(C$_{1-4}$-alkyl) acrylic acid wherein at least 30% and less than 95% of the —COOH groups are converted to —COY groups wherein Y is either —OR$^1$ or —NR$^2$R$^3$;

R$^1$ is C$_{6-18}$-alkyl or cycloalkyl;

R$^2$ is hydrogen, alkyl or cycloalkyl; and

R$^3$ is alkyl or cycloalkyl;

provided that the total number of carbon atoms represented by R$^2$ and R$^3$ is from 6 to 18.

16. A coating composition comprising pigment, a resin, a non-aqueous medium and the polymer of claim 1, said polymer functioning as a rheology modifier to minimize sag.

* * * * *